(12) United States Patent
Souza et al.

(10) Patent No.: US 8,087,431 B2
(45) Date of Patent: Jan. 3, 2012

(54) WEAR PAD

(75) Inventors: James M Souza, Houston, TX (US);
Genevieve Withers, Houston, TX (US)

(73) Assignee: Pipe Wrap, LLC, Houston, TX (US)

( * ) Notice: Subject to any disclaimer, the term of this patent is extended or adjusted under 35 U.S.C. 154(b) by 115 days.

(21) Appl. No.: 12/786,337

(22) Filed: May 24, 2010

(65) Prior Publication Data

US 2010/0294389 A1 Nov. 25, 2010

Related U.S. Application Data

(60) Provisional application No. 61/180,864, filed on May 24, 2009.

(51) Int. Cl.
*F16L 3/00* (2006.01)

(52) U.S. Cl. ............ 138/106; 138/103; 248/49; 248/55

(58) Field of Classification Search .................. 138/106, 138/103; 248/49, 55
See application file for complete search history.

(56) References Cited

U.S. PATENT DOCUMENTS

| | | | | |
|---|---|---|---|---|
| 3,026,076 A | * | 3/1962 | Bender | 248/49 |
| 4,017,046 A | * | 4/1977 | Hicks | 248/55 |
| 4,040,447 A | * | 8/1977 | Scott | 204/196.16 |
| 5,234,221 A | * | 8/1993 | Freisleben | 277/312 |
| 6,691,742 B1 | * | 2/2004 | Cooper | 138/106 |
| 7,278,613 B2 | * | 10/2007 | Roy | 248/49 |
| 7,730,908 B2 | * | 6/2010 | Johnson | 138/106 |
| 8,038,105 B2 | * | 10/2011 | Deichman | 248/58 |
| 2005/0241714 A1 | * | 11/2005 | Barnhouse et al. | 138/106 |
| 2007/0221279 A1 | * | 9/2007 | Johnson | 138/106 |

* cited by examiner

*Primary Examiner* — Patrick F Brinson
(74) *Attorney, Agent, or Firm* — Clarence E. Eriksen & Assoc., P.C.

(57) ABSTRACT

A wear pad for a piping structure which is supported by a support structure is disclosed. A wear pad according to the present invention comprises a fiber reinforced polymer (FRP) composite pre-form structure for attachment to the piping structure where the fiber reinforced polymer (FRP) composite pre-form structure has a shape conforming to the shape of the exterior of the piping structure. A stand-off patch is adhesively bonded to one side of the fiber reinforced polymer (FRP) composite pre-form structure, and this stand-off patch defines the thickness of the bond between the piping structure and the fiber reinforced polymer (FRP) composite pre-form structure when it is in attached to the piping structure. SMP adhesive material is used to adhesively bond the fiber reinforced polymer (FRP) composite structure to the piping structure.

6 Claims, 1 Drawing Sheet

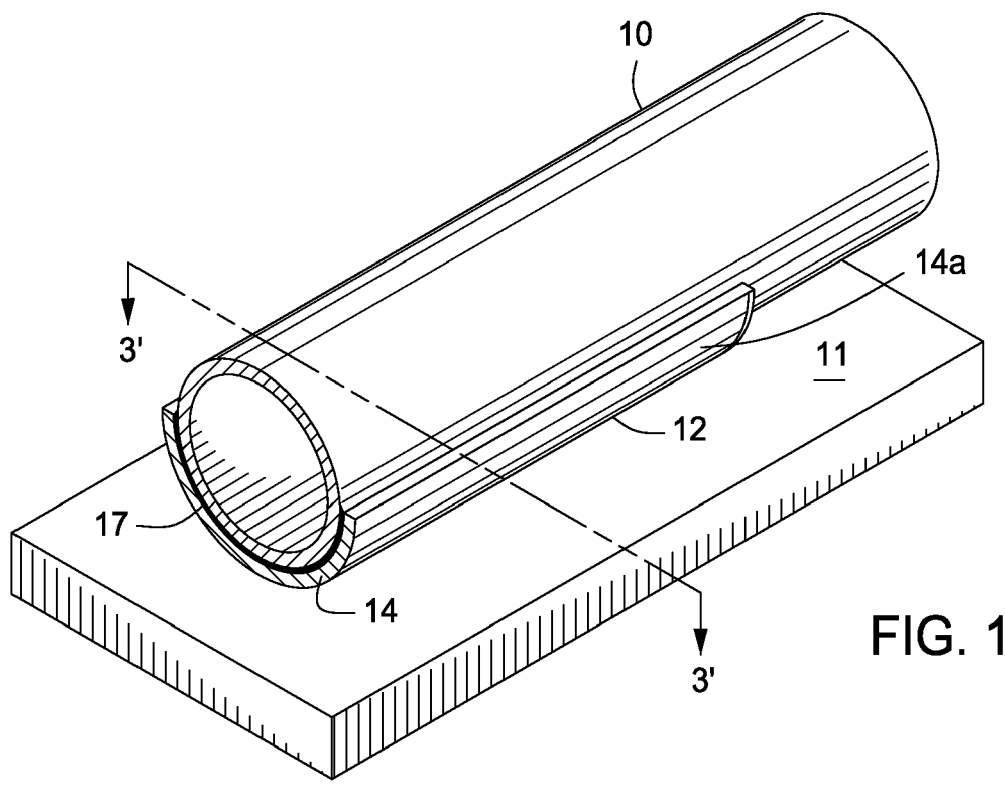
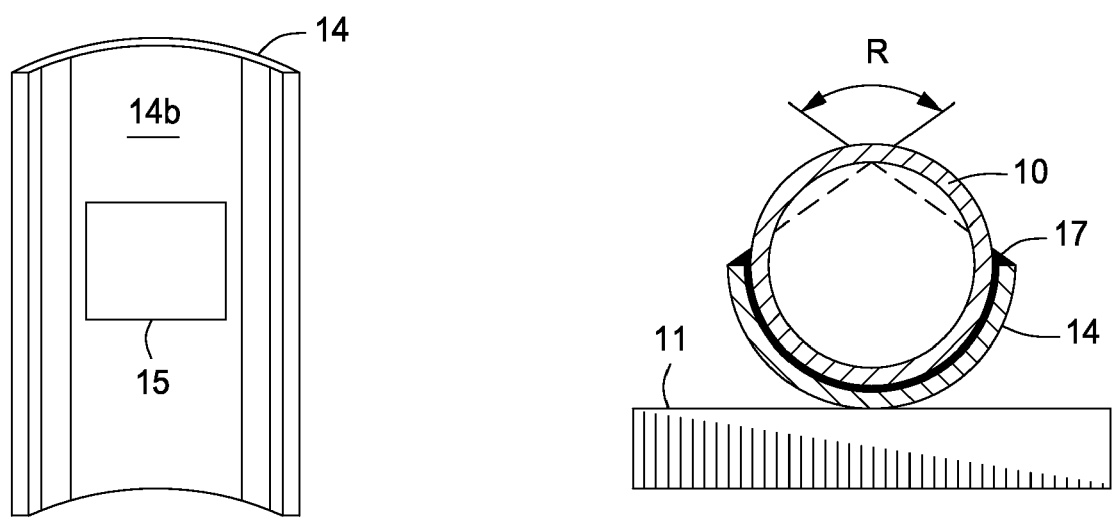
FIG. 2
FIG. 3

WEAR PAD

CROSS-REFERENCE TO RELATED APPLICATION

This application claims the benefit of the filing date of U.S. Provisional Application No. 61/180,864, filed May 24, 2009.

BACKGROUND OF THE INVENTION

1. Field of the Invention

The present invention relates to a wear pad for attachment to a piping structure which is supported by a support mechanism such as pipe supports, pipe hangers, stanchions, pipe clamps, etc.

2. Description of the Prior Art

Piping structures are commonly used in industrial and commercial facilities as a means for moving a fluid from one location to another. While such piping structures are commonly composed of tubular structures, such piping structures may also have non-circular cross-sectional areas.

Movement of a fluid through a piping structure is very often turbulent, which causes the piping structure to move with respect to its support structure. Additionally, changes in temperature can likewise cause the piping structure to move with respect to the support structure. Such movement of the piping structure may result in abrasion of the coated or painted pipe surface resulting in the exposure of bare steel surfaces. This type of condition may result in corrosion forming on the piping structure in the area where the piping structure contacts the support structure. Such corrosion is commonly referred to as crevice corrosion, because it forms in the crevice between the piping and support structure. If the crevice corrosion is left unchecked, the piping structure will deteriorate as a result of the crevice corrosion and leaks will occur in the piping structure.

Wear pads have been utilized in such systems to keep the piping structure out of direct contact with the support structure. Wear pads according to the prior art have been affixed to the piping structure utilizing epoxy materials to bond the wear pad to the piping structure. Such approach has at least two drawbacks. First, with epoxy bonding, the elongation of the epoxy which is necessary at elevated temperatures cannot be achieved, i.e., high elongation of the epoxy may only be achieved at low operating temperatures. Second, since there is low elongation of epoxy at high temperatures, the epoxy bond between the wear pad and the piping structure tends to be brittle.

Flat thermoplastic wear pads and thermoplastic wear rods have also been interposed between piping structures and support structures. The piping structure wears into the thermoplastic pad or rod after a period of time and crevice corrosion may begin to form.

SUMMARY OF THE INVENTION

The present invention comprises a wear pad which provides surface protection for piping structures from crevice corrosion. A wear pad in accordance with the present invention may be utilized as an initial protection system or for rehabilitation of wall loss no greater than 30% of the original wall thickness. A wear pad in accordance with the present invention provides a barrier or wear surface between the piping structure and structure's support mechanism such as pipe supports, pipe hangers, stanchions, pipe clamps, etc.

A wear pad in accordance with the present invention comprises a fiber reinforced polymer (FRP) composite pre-form structure for attachment to the piping structure. The fiber reinforced polymer (FRP) composite pre-form structure has a shape conforming to the exterior shape of the piping structure. The fiber reinforced polymer (FRP) composite pre-form structure has first and second sides, where the first side contacts the support structure when the wear pad is attached to the piping structure. A stand-off patch is adhesively bonded to the second side of the fiber reinforced polymer (FRP) composite pre-form structure, and, when the wear pad is adhesively bonded to the piping structure, the stand-off patch defines the thickness of the bond between the piping structure and the fiber reinforced polymer (FRP) composite pre-form structure. The thickness of the bond between the piping structure and the fiber reinforced polymer (FRP) composite pre-form structure may be in the range between 0.001" and 0.030", and, in one embodiment, the thickness of the bond is in the range of 0.005" to 0.010".

A wear pad in accordance with the present invention further comprises Silyl Modifiedpolymer (SMP) adhesive material disposed on the second side of the fiber reinforced polymer (FRP) composite structure which is used to adhesively bond the fiber reinforced polymer (FRP) composite pre-form structure to the piping structure.

When the piping structure comprises tubular members, the fiber reinforced polymer (FRP) composite pre-form structure has a concave-shaped second side which conforms to the shape of a portion of the circumference of the tubular piping structure. Such a concave-shaped second side of the fiber reinforced polymer (FRP) composite pre-form structure is designed such that the wear pad can engage the full circumference of the piping structure. In one embodiment, however, fiber reinforce polymer (FRP) composite only engages between 1/36 and 1/2 of the circumference of the tubular piping structure (i.e., between 10° and 180° of the piping structure) when the wear pad is bonded to the piping structure. In one embodiment, the second side of the fiberglass reinforced polymer (FRP) composite pre-form structure is designed such that the wear pad engages one quarter of the circumference of the tubular piping structure (i.e., 90° of the piping structure) when bonded to the piping structure.

The fiber reinforced polymer (FRP) composite pre-form structure is configured to closely match the mating structure and is designed sufficiently to enable liquid to shed when oriented in position. The rigid fiber reinforced polymer (FRP) composite pre-form structure may comprise fibers in strand form, cloth form, chopped form, powder form or any combination of aforementioned fiber forms which may, for example, comprise fiberglass, carbon, aramid fibers or combination thereof which then are impregnated with a resinous matrix and cured into the final wear pads form. The resinous matrix may, for example, comprise polyester resin, vinyl ester resin, epoxy, urethane and polyamides.

As noted above, a wear pad in accordance with the present invention may be utilized to rehabilitate a piping system having no more than 30% wall loss. In these situations, epoxy material is applied to the wall of the piping to fill in the piping structure where crevice corrosion has occurred, and a wear pad in accordance with the present invention is then adhesively bonded to the piping structure where the epoxy filler has been applied.

BRIEF DESCRIPTION OF THE DRAWINGS

In the accompanying drawings:

FIG. 1 is an isometric drawing illustrating a wear pad in one embodiment according to the present invention.

FIG. 2 is a perspective of a portion of a wear pad according to the present invention.

FIG. 3 is a cross-sectional drawing taken along line 3-3' of FIG. 1.

DESCRIPTION OF SPECIFIC EMBODIMENTS

It will be appreciated that the present invention may take many forms and embodiments. In the following description, some embodiments of the invention are described and numerous details are set forth to provide an understanding of the present invention. Those skilled in the art will appreciate, however, that the present invention may be practiced without those details and that numerous variations and modifications from the described embodiments may be possible. The following description is thus intended to illustrate and not to limit the present invention.

Referring to FIGS. 1-3, wear pad 12 is interposed between piping structure 10 and support structure 11. Wear pad 12 comprises a fiber reinforced polymer (FRP) composite pre-form structure 14 for attachment to the piping structure 10 and has a shape conforming to the exterior shape of piping structure 10. In FIGS. 1-3 piping structure 10 is illustrated as a tubular member and wear pad 12 will have a generally concave-shaped portion which conforms to a portion of the circumference of piping structure 10. Those skilled in the art will, however, recognize that piping structure 10 may have a non-circular cross-sectional area.

The fiber reinforced polymer (FRP) composite pre-form structure 14 is a rigid structure and may comprise fibers in strand form, cloth form, chopped form, powder form or any combination of those fiber forms which may, for example, comprise fiberglass, carbon, aramid fibers or any combination thereof. These fibers of which fiber reinforced polymer (FRP) composite pre-form structure 14 is composed are impregnated with a resinous matrix and cured into the final reinforced polymer (FRP) composite pre-form structure 14. The resinous matrix may, for example, comprise polyester resin, vinyl ester resin, epoxy, urethane and polyamides.

The fiber reinforced polymer (FRP) composite pre-form structure 14 comprises first and second sides 14a and 14b, and when wear pad 12 is bonded to piping structure 10 as discussed below, side 14a contacts the support structure 11. A stand-off patch 15 is adhesively bonded to the second side 14b of the fiber reinforced polymer (FRP) composite pre-form structure 14, and the stand-off patch 15 may comprise a butyl tape with a mastic film to enable its bonding to side 14b of fiber reinforced polymer (FRP) composite pre-form structure 14. When so bonded, the stand-off patch 15 defines the thickness of the bond between the piping structure 10 and the fiber reinforced polymer (FRP) composite pre-form structure 14. The thickness of the bond between piping structure 10 and the fiber reinforced polymer (FRP) composite pre-form structure 14 may be selected to be in the range of 0.001" to 0.030", and in one embodiment the range for the bond thickness is between 0.005" to 0.010".

Still referring to FIGS. 1-3, wear pad 12 further comprises SMP adhesive material 17 which is disposed on the side 14b of fiber reinforced polymer (FRP) composite pre-form structure 14. The SMP adhesive material 17, which is illustrated in black in FIG. 3, is used to adhesively bond the fiber reinforced polymer (FRP) composite pre-form structure 14 to the piping structure 10.

With reference to FIG. 3, when the piping structure 10 comprises tubular members, the side 14b of one fiber reinforced polymer (FRP) composite pre-form structure 14 has a concave shape which conforms to the shape of a portion of the circumference of the tubular piping structure 10. The range of the concave shape of side 14b is between 1/36 and 1/2 of the circumference of the tubular piping member 10 (i.e., the range of arc R is between 10° and 180°) when the wear pad 12 is bonded to the piping structure 10. In one embodiment the fiber reinforced polymer (FRP) composite pre-form structure 14 is designed such that the wear pad 12 engages one quarter of the circumference of the tubular piping structure 10 (i.e., arc R is 90°) when bonded to the piping structure 10.

The SMP adhesive material has the following properties:

Technical Data

| | | |
|---|---|---|
| Basic Material | Silyl Modifiedpolymer (SMP) | |
| Curing Method | Moisture | |
| Specific Gravity | ca. 1.4 g/ml | |
| Skin Forming Time | ca. 10 min. | (70° F./20° C. @ 50% R.H.) |
| Open Time | <15 min. | (70° F./20° C. @ 50% R.H.) |
| Curing Speed after 24 hrs | ca. 3 mm | (70° F./20° C. @ 50% R.H.) |
| Shore A Hardness | ca. 65 | (DIN 53505) |
| Volume Change | <3% | (DIN 52451) |
| Green Strength | ca. 1800 Pa | (Physical Rheometer MC100) |
| | (Maximum load which can be applied per meter$^2$ uncured adhesive without sagging) | |
| Electrical Volume Resistivity | >1011 Vcm | (DIN 53482) |
| Tensile Stress | (100%) 300 psi (ca. 2.1 MPa) | (DIN 53504/ISO 37) |
| Tensile Stress at Break | 420 psi (ca. 2.9 MPa) | (DIN 53504/ISO 37) |
| Elongation at Break | ca. 225% | (DIN 53504/ISO 37) |
| Shear Stress 360 psi | (ca. 2.5 MPa) | (DIN 53283/ASTM D1002) |
| | (Aluminum-to-Aluminum; adhesive thickness mm$^2$, test speed 50 mm/min.) | |
| Operating Temperature | 40° F. to 248° F. (−40° C. to +120° C.) | |
| Max Temperature Resistance | 356° F. (+180° C.) (max. ½ hr) | |
| Application Temperature | 41° F. to 95° F. (+5° C. to +35° C.) | |
| UV and Weather Resistance | Very good | |

What is claimed is:

1. A wear pad for a piping structure which is supported by a support structure, comprising:

a fiber reinforced polymer (FRP) composite pre-form structure for attachment to the piping structure, said fiber reinforced polymer (FRP) composite pre-form structure having a shape conforming to the shape of the piping structure and having first and second sides, where the first side contacts the support structure when the wear pad is attached to the piping structure;

a stand-off patch which is adhesively bonded to the second side of the fiber reinforced polymer (FRP) composite pre-form structure and which, when the wear pad is attached to the piping structure, defines the thickness of the bond between the piping structure and the fiber reinforced polymer (FRP) composite pre-form structure; and SMP adhesive material which is disposed on the second side of the fiber reinforced polymer (FRP) composite structure for adhesively bonding the fiber reinforced polymer (FRP) composite pre-form structure to the piping structure, and which, when set, provides the bond between the fiber reinforced polymer (FRP) composite structure and the piping structure.

2. The wear pad of claim 1, wherein the piping structure comprises a tubular member and wherein the second side of the fiber reinforced polymer (FRP) composite pre-form structure is concave in shape to engage a portion of the circumference of the tubular member.

3. The wear pad of claim 2, wherein the second side of the fiber reinforced polymer (FRP) composite pre-form structure is designed to engage between a $\frac{1}{36}$ and $\frac{1}{2}$ of the circumference of the tubular member.

4. The wear pad of claim 3, wherein the second side of the fiber reinforced polymer (FRP) composite pre-form structure is designed to engage $\frac{1}{4}$ of the circumference of the tubular member.

5. The wear pad of claim 1, wherein the thickness of the bond between the piping structure and the fiber reinforced polymer (FRP) composite pre-form structure is in the range of 0.001" to 0.030".

6. The wear pad of claim 5, wherein the thickness of the bond between the piping structure and the fiber reinforced polymer (FRP) composite pre-form structure is in the range of 0.005" to 0.010".

* * * * *